(12) United States Patent
Opificius et al.

(10) Patent No.: US 11,358,727 B2
(45) Date of Patent: Jun. 14, 2022

(54) METHOD AND APPARATUS FOR PREDICTING CONDITIONS FAVORABLE FOR ICING

(71) Applicant: GE Aviation Systems Limited, Gloucestershire (GB)

(72) Inventors: Julian Alexander Opificius, Elk River, MN (US); Stephen C. Carlson, Roscoe, IL (US)

(73) Assignee: GE Aviation Systems Limited, Gloucestershire (GB)

( * ) Notice: Subject to any disclaimer, the term of this patent is extended or adjusted under 35 U.S.C. 154(b) by 359 days.

(21) Appl. No.: 16/035,729

(22) Filed: Jul. 16, 2018

(65) Prior Publication Data
US 2019/0061959 A1 Feb. 28, 2019
US 2021/0114738 A9 Apr. 22, 2021

(30) Foreign Application Priority Data
Aug. 25, 2017 (GB) ..................... 1713706

(51) Int. Cl.
*B64D 15/22* (2006.01)
*B64D 45/00* (2006.01)
*G08G 5/00* (2006.01)

(52) U.S. Cl.
CPC .............. *B64D 15/22* (2013.01); *B64D 45/00* (2013.01); *G08G 5/0021* (2013.01); *G08G 5/0039* (2013.01); *G08G 5/0091* (2013.01)

(58) Field of Classification Search
None
See application file for complete search history.

(56) References Cited

U.S. PATENT DOCUMENTS

| 4,210,021 | A | * | 7/1980 | Vykhodtsev | ........... | B64D 15/20 340/580 |
| 4,980,673 | A | * | 12/1990 | Kleven | ................... | G08B 19/02 244/134 F |
| 5,140,135 | A | | 8/1992 | Freeman | | |
| 6,320,511 | B1 | | 11/2001 | Cronin et al. | | |
| 6,328,467 | B1 | * | 12/2001 | Keyhani | ................ | B64D 15/20 374/16 |
| 7,175,136 | B2 | | 2/2007 | Sha et al. | | |
| 7,230,205 | B2 | | 6/2007 | Twerdochlib | | |

(Continued)

FOREIGN PATENT DOCUMENTS

| CN | 101792021 A | 8/2010 |
| CN | 101792021 A | 8/2010 |

(Continued)

OTHER PUBLICATIONS

Great Britain Search Report dated Feb. 6, 2018 which was issued in connection with GB 1713706.8 which was filed on Aug. 25, 2017.

*Primary Examiner* — Genna M Mott
(74) *Attorney, Agent, or Firm* — McGarry Bair PC

(57) ABSTRACT

A method and apparatus for predicting conditions favorable for icing, includes sensing a value indicative of a thermal cycling period, comparing, the sensed thermal cycling period with a threshold value, determining, if the sensed thermal cycling period satisfies the threshold value, and indicating, by the controller module, that conditions favorable for icing are present when the sensed thermal cycling period satisfies the threshold value.

17 Claims, 5 Drawing Sheets

(56) References Cited

U.S. PATENT DOCUMENTS

| | | | |
|---|---|---|---|
| 7,628,359 B2 | 12/2009 | Shah et al. | |
| 7,965,201 B2 | 6/2011 | Shah et al. | |
| 8,602,359 B2 | 12/2013 | Stothers | |
| 9,201,031 B2 | 12/2015 | Lilie et al. | |
| 9,221,548 B1 * | 12/2015 | Sishtla | G06T 7/00 348/144 |
| 9,666,051 B2 | 5/2017 | Rossotto et al. | |
| 2007/0170312 A1 | 7/2007 | Al-Khalil | |
| 2007/0295712 A1 * | 12/2007 | Forman | B64D 15/14 219/492 |
| 2008/0142638 A1 | 6/2008 | Chapman et al. | |
| 2012/0061482 A1 | 3/2012 | Stothers et al. | |
| 2012/0091276 A1 * | 4/2012 | Al-Khalil | B64D 15/14 244/134 A |
| 2012/0193477 A1 * | 8/2012 | Thorez | B64D 15/20 244/134 F |
| 2013/0142214 A1 | 6/2013 | Schlotterbeck et al. | |
| 2014/0150478 A1 * | 6/2014 | Uselton | F25D 21/06 62/80 |
| 2014/0321839 A1 * | 10/2014 | Armstrong | F24H 9/2021 392/463 |
| 2017/0081032 A1 * | 3/2017 | Botura | B64D 15/12 |
| 2017/0370960 A1 * | 12/2017 | Benning | G01K 13/028 |
| 2018/0051921 A1 * | 2/2018 | Ho | B60H 1/00642 |
| 2018/0355797 A1 * | 12/2018 | Islam | B64D 15/14 219/492 |

FOREIGN PATENT DOCUMENTS

| | | |
|---|---|---|
| CN | 105314117 A | 2/2016 |
| CN | 105314117 A | 2/2016 |
| CN | 106081123 A | 11/2016 |
| CN | 106081123 A | 11/2016 |
| DE | 19757079 A1 | 6/1998 |
| DE | 19757079 A1 | 6/1998 |
| GB | 25443452 A | 4/2017 |

* cited by examiner

METHOD AND APPARATUS FOR PREDICTING CONDITIONS FAVORABLE FOR ICING

BACKGROUND OF THE INVENTION

The formation of ice on aircraft structures, such as engine inlets, wings, control surfaces, propellers, booster inlet vanes, inlet frames, etc., is a problem for contemporary aircraft. Ice adds weight, increases drag, and alters the aerodynamic contour of airfoils, control surfaces and inlets, all of which reduce performance and increase fuel consumption. In addition, ice that forms on aircraft structures can become dislodged, increasing risk to other aircraft parts and engine components. Contemporary aircraft can include de-icing or anti-icing systems that utilize heat sources or heat generating elements to provide heat to the aircraft structure to melt or prevent the formation of ice.

BRIEF DESCRIPTION OF THE INVENTION

In one aspect, the present disclosure relates to a method of predicting conditions favorable for icing, including sensing, in a sensor, a value indicative of a thermal cycling period in a component, comparing, in a controller module, the sensed thermal cycling period with a threshold thermal cycling period for the component, determining, in the controller module, if the sensed thermal cycling period satisfies the threshold thermal cycling period, indicating, by the controller module, that conditions favorable for icing are present when the controller module determines that the sensed thermal cycling period satisfies the threshold thermal cycling period, and altering operation of a system based on the indication.

In another aspect, a system for predicting environmental conditions includes a heat generating circuit that operates in thermal cycles defined by a first period of time when the heat generating circuit generates heat while energized, and by a second period of time when the heat generating circuit does not generate heat while not energized, a sensor adapted to sense a value indicative of the thermal cycle of the heat generating circuit, and a controller module configured to compare the sensed value indicative of the thermal cycle with a threshold thermal cycle, determine if the sensed thermal cycle satisfies the threshold thermal cycle, and indicate that conditions favorable for icing exist when the sensed thermal cycle period satisfies the threshold thermal cycle.

DESCRIPTION OF EMBODIMENTS OF THE INVENTION

Figure 1:
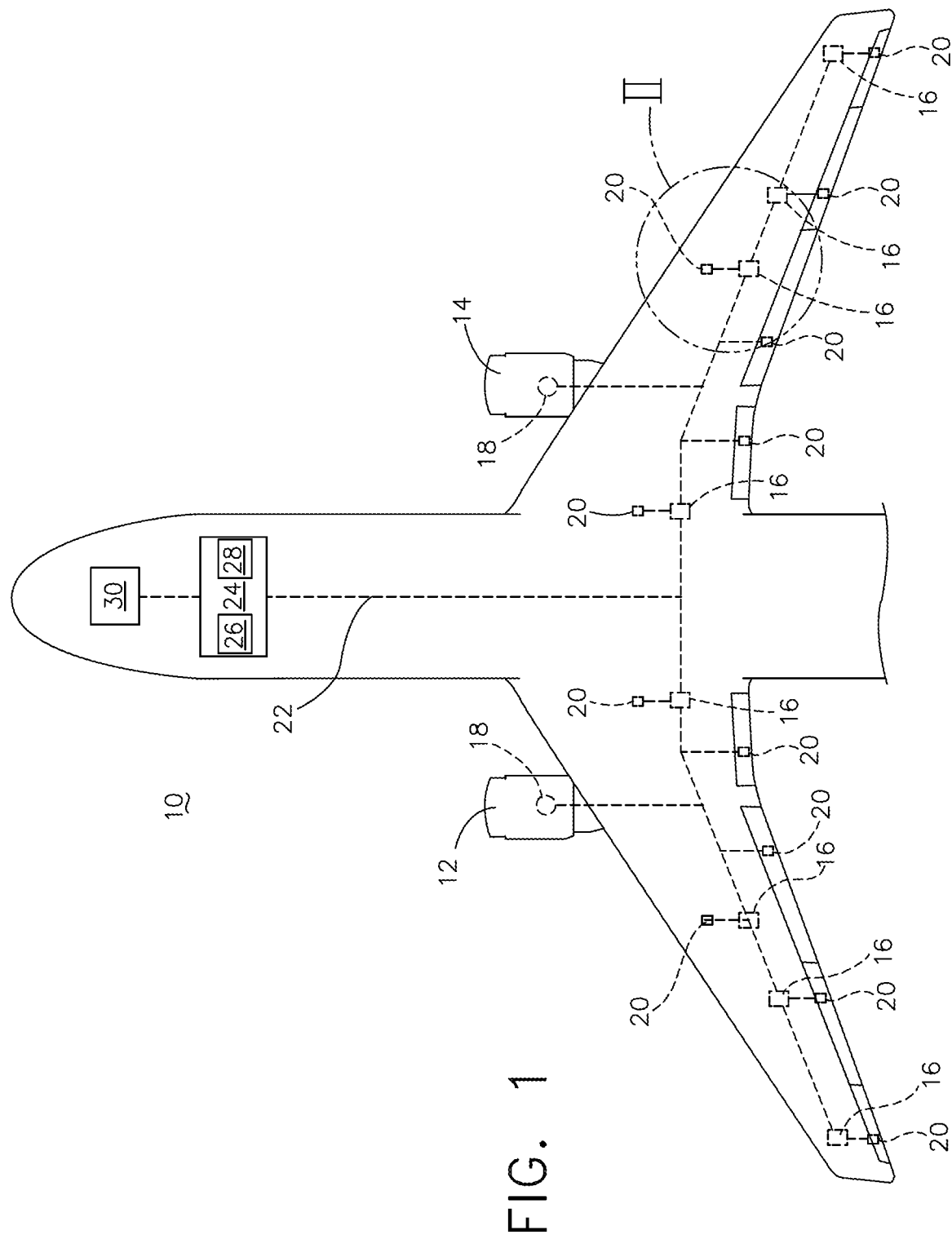
FIG. 1 is a top-down schematic view of an aircraft in accordance with various aspects described herein.

Aspects of the disclosure can be implemented in any environment, apparatus, or method for predicting conditions favorable for icing. One non-limiting example environment described herein includes a method and system for predicting conditions favorable for ice formation on an aircraft structure or housing. Furthermore, the method and system described herein can be applicable to aircraft during flight or non-flight operations.

It will be understood that the term "anti-icing" refers to the prevention of the formation of ice, whereas the term "de-icing" refers to the reduction, or elimination, of ice after it has begun to form. It will be understood that although the term "anti-icing" is consistently used throughout, aspects of the disclosure are not to be so limited, but are applicable to de-icing systems as well. As used herein, "conditions favorable for the formation of ice" can include environmental conditions that allow for, enable, are conducive to, or can indicate ice can, will, or may form. Thus, "conditions favorable for the formation of ice" are not limited to environmental conditions wherein ice will form, but may include conditions where it might form. Conditions favorable for the formation of ice can be based on relative, dynamic, or static conditions or values. As conditions favorable for the formation of ice can occur at a wide range of altitudes and temperatures, and can appear with little warning, it is very important to detect or predict CFFI as soon as possible.

While "a set of" various elements will be described, it will be understood that "a set" can include any number of the respective elements, including only one element. The use of the terms "proximal" or "proximally," either by themselves or in conjunction with the other components refers to moving in a direction toward a referencing point, or a component being relatively closer to the referencing point, as compared to another component.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interchangeable when describing aspects of the electrical circuit, or circuit operations.

The term "satisfies" the threshold value is used herein to mean that the sensed value is equal to or greater than the power threshold value, or being within a power threshold value range (e.g. within tolerance). It will be understood that such a determination may easily be altered to be satisfied by a positive/negative comparison or a true/false comparison.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. The exemplary drawings are for purposes of illustration only and the dimensions, positions, order and relative sizes reflected in the drawings attached hereto can vary.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

FIG. 1 illustrates a schematic top-down view of an aircraft 10, which can include an anti-icing system. As shown, the aircraft 10 can include a first engine system 12 and a second engine system 14. Non-limiting aspects of the aircraft 10 can include fewer or additional engine systems. The first and second engine systems 12, 14 can be substantially identical, and can further include at least one heat source 18, shown schematically. The anti-icing system can include at least one heat source 18 and can be further connected to a set of aircraft surfaces 20 spaced about the aircraft 10, by way of a network of heat passages 22. In one non-limiting example, the heat passages 22 can further include heat distribution nodes 16 for selectably or controllably distributing heat from the at least one heat source 18 to the set of aircraft surfaces 20.

Non-limiting aspects of the aircraft 10 or the anti-icing system can further include a controller module 24 having a processor 26 and memory 28 operably connected with at least one of the heat sources 18, the heat distribution nodes 16, or the set of aircraft surfaces 20, for example, by way of the heat passages 22. While the controller module 24 is shown connected with the heat passages 22 for brevity and ease of understanding, non-limiting aspects of the disclosure can be included wherein the controller module 24 is communicatively connected with the anti-icing system through separate connectors, such as conductive wiring or communication buses. Examples of the controller module 24 can include aircraft 10 operational computers, system, subsystems, or the like. The controller module 24 can be further communicatively connected with at least one display 30 viewable by a pilot, co-pilot, or the like. Non-limiting examples of the display 30 can any sort of indicator or indication device, including flight displays, monitors, computer-based screens, light emitting diodes (LEDs), light bulbs, the like, or combinations thereof.

One non-limiting example of the aircraft 10 or the anti-icing system can include a fluid-based heating system, such as a heating system utilizing hot compressed air from at least one of the first or second engine systems 12, 14. Such hot compressed air is commonly referred to as bleed air. The bleed air can be tapped from a bleed-air port of at least one of the first or second engine systems 12, 14 at any suitable portion of the engine core including, but not limited to, one of the compressor section(s) or one of the turbine section(s). Thus, in this example, the at least one heat source 18 can include the engine system 12, 14, or the hot gases generated therein. The bleed air system can divert the hot gases through fluid conduit-type heat passages 22 and heat distribution nodes 16, and deliver the bleed air to the set of aircraft surfaces 20, where and when needed. In further non-limiting examples, nozzles can be included to direct the hot bleed air to any suitable portions of the aircraft 10 or set of aircraft surfaces 20 to melt or prevent the formation of ice.

Another non-limiting example of the aircraft 10 or the anti-icing system can include an electrical power-based heating system. In this example, the at least one heat source 18 can include a generator system, electrical storage device (e.g. a battery, supercapacitor, fuel cell, or the like), renewable energy source (e.g. solar cells, wind turbine generator, or the like), or the like, adapted or configured to supply a source of electricity or electrical power. In this sense, the heat passages 22 can be conductive pathways, such as bus bars, power transmission lines, or the like, and the heat distribution nodes 16 can include power distribution nodes or switching elements to enable or disable the supplying of power from the power source to the set of aircraft surfaces 20. Additionally, non-limiting aspects of the disclosure can include electrical heating elements at the set of aircraft surfaces 20, which can utilize the electricity or electrical power to generate heat at the surfaces 20.

It will be understood that while aspects of the disclosure are shown in an aircraft environment of FIG. 1, the disclosure is not so limited and has general application to anti-icing systems in non-aircraft applications, such as other mobile applications and non-mobile industrial, commercial, and residential applications. It will be understood that the illustrated aspects of the disclosure are only one non-limiting example of an aircraft 10, and many other possible aspects and configurations in addition to that shown are contemplated by the present disclosure.

Furthermore, the number of, and placement of, the various components depicted in FIG. 1 are also non-limiting examples of aspects associated with the disclosure. For example, while various components have been illustrated with relative position of the aircraft 10, aspects of the disclosure are not so limited, and the components are not so limited based on their schematic depictions. For instance, specific aircraft surfaces 20 can include, but are not limited to a portion of a wing, an aerofoil, a fuselage, a nacelle, or the like. In another non-limiting example, an aircraft surface 20 can include a sensing area for a sensor, a patch of surface area, a representative location of a surface 20 or aircraft 10 component (e.g. representative of a wing, fuselage, etc.), or a protected surface commonly subjected to icing conditions The aircraft surface 20 can include, for example, an outer surface of the aircraft 10 (e.g. if the thermal properties of the outer surface are such that the thermal time constraint is short, that the surface temperature varies rapidly, or a combination thereof), or the aircraft surface 20 can represent a sensor incorporated into the air stream or environment directly, such as a temperature sensor in an engine inlet. Additional aircraft surfaces 20 can be included or representative.

Figure 2:
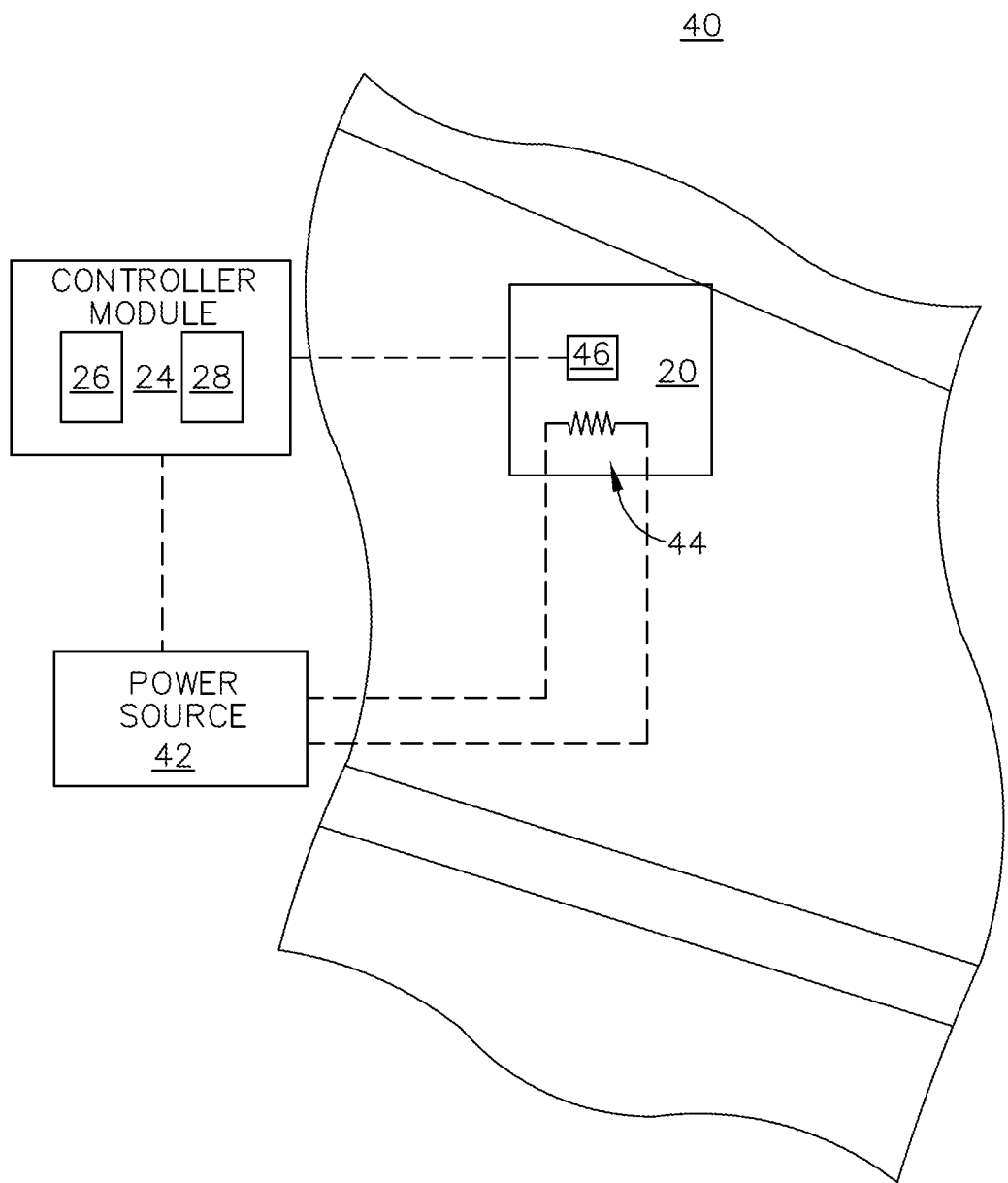
FIG. 2 is a schematic view of a system for predicting conditions favorable for icing for the aircraft of FIG. 1, in accordance with various aspects described herein.

FIG. 2 illustrates a schematic representation of a zoomed portion of FIG. 1, such as a system 40 or anti-icing system, for predicting environmental conditions. As shown, an aircraft surface 20 portion can include a sensor 46 communicatively connected with the controller module 24. Additionally, non-limiting aspects of the anti-icing system can include an optional heating element 44, shown schematically as a resistive element, connected with the heat source 18. Thus, as schematically shown, the anti-icing system can include a heat generating circuit 42 including the optional heating element 44 and heat source 18, such as the power source described herein. In another non-limiting example, the controller module 24 can be communicatively connected (via dotted line) with the heat source 18, the heat generating circuit 42, or a combination thereof, and operable to controllably enable, energize, or otherwise control the heat generation by the optional heating element.

Non-limiting aspects of the disclosure can be included wherein the sensor 46 can be adapted, operable, or enabled to sense a value indicative of a thermal cycle or thermal cycling period for the aircraft, the aircraft surface 20, the heat generating circuit 42, the heating element 44, the like, or a combination thereof. In another non-limiting aspect of the disclosure, aircraft lacking a heating or de-icing system can still include a sensor 46 adapted, operable, or enabled to sense a value indicative of a thermal cycle or thermal cycling period of the sensor 46 itself, or another heat generating element 44 adapted to heat or warm the sensor 46 such that the sensor 46 can obtain a proper or accurate sensor reading or measurement. In one non-limiting aspect of the disclosure, the sensor 46 can include a power sensor adapted, operable, or enabled to sense or measure a power value, such as a voltage, current, or power supplied, applied, or consumed by the respective heating element 44 or heat generating circuit 42. In another non-limiting aspect of the disclosure, the sensor 46 can include a temperature sensor adapted, operable, or enabled to sense or measure a temperature value relative to the aircraft surface 20, the heating element 44, the heat generating circuit 42, or the like.

Regardless of the sensor 46 utilized, the sensor 46 can sense or measure a heating or thermal cycle or thermal cycling period, that is, at least one of a heating cycle (e.g. temperature increasing period), a cooling cycle (e.g. temperature decreasing period, such as after a heating cycle), a rate of increase or decrease (e.g. a rate of change) in the heating or cooling cycle, or a combination thereof. The sensor 46 can further be adapted to provide the sensing or measuring of the thermal cycle or thermal cycling period to the controller module 24, which can, for example, record, log, or otherwise determine information or data related to the sensed values over a period of time.

During anti-icing system operations, the sensor 46 can sense or measure a value indicative of the thermal cycling period. As explained herein, the value indicative of the thermal cycling period can include a power value, a temperature value, or the like, over at least one of a period of increasing thermal activity or heating, a period of decreasing thermal activity or cooling, or a combination thereof. The controller module 24, in response to receiving or obtaining the sense or measured values related to the thermal cycling period, can compare the thermal cycling period with a threshold thermal cycling period. In one non-limiting example, the threshold thermal cycling period can include data, a data range, a time period of heating or cooling, a rate of change thereof, or the like, derived or determined from empirical data or known thermal cycling periods. In another aspect of the disclosure, the threshold thermal cycling period can be predetermined. In yet another aspect of the disclosure, the threshold thermal cycling period can be indicative of conditions favorable for the formation of ice. In yet another aspect of the disclosure, the threshold thermal cycling period can include or be based from a ratio of the energizing or heating cycle relative to the de-energized or cooling cycle. While a "ratio" is described, it is understood a ratio can be reflected as at least a portion of a duty cycle for the component, or the like. In yet another non-limiting aspect of the disclosure, the controller module 24 can be communicatively connected with, and receive data from, another aircraft computer system, such as a full authority digital engine control (FADEC), digital computer, flight computer, engine control unit, or the like.

Non-limiting examples of the threshold thermal cycling period indicative of conditions favorable for the formation of ice can include, but are not limited to, airspeed, air or environmental temperature (for instance, relative to the aircraft or aircraft surface 20), air density of the environment, humidity of the environment, liquid water content of the environment, the like, or a combination thereof. The threshold thermal cycling period indicative of conditions favorable for the formation of ice can also be affected by or based on static factors, including but not limited to, the surface area of the aircraft surface 20 associated with the anti-icing system or the heat generating circuit 42, aerodynamic shape, internal thermal leakage, or the like.

The controller module 24 can determine if the comparison of the thermal cycling period sensed satisfies the threshold thermal cycling period, as described herein. In this comparison, the controller module 24 can determine if the conditions favorable to the formation of ice are present or not. If conditions favorable to the formation of ice are present, non-limiting aspects of the disclosure can be included wherein the controller module 24 indicates, or provides indication of the conditions favorable to the formation of ice. In one non-limiting example, the indication can be in the form of an alert message or display indicator on the display 30, for a pilot or co-pilot. In the non-limiting aspect of the disclosure where the controller module 24 can be communicatively connected with, and receive data from, another aircraft computer system, the data received from the other aircraft system can also be used in indication the conditions relative to the environment, aircraft status or operation, or the like. In this example, the other aircraft computer system can provide data further used to compare, determine, or indicate conditions favorable for the formation of ice.

In another non-limiting aspect of the disclosure, when conditions favorable to the formation of ice are present, the controller module 24 can operate, operably control, or enable the operation of the heat source 18, the heating element 44, the heat generating circuit 42, or a combination there of The controller module 24 operation of the heat source 18, the heating element 44, or the heat generating circuit 42 can operably generate a sufficient amount of heat at the aircraft surface 20 to prevent the formation of ice, or to melt or otherwise dispose of ice that can be accumulating. In another non-limiting example, the controller module 24 can operate specialized heating cycles of the heat source 18, the heating element 44, the heat generating circuit 42, or combination thereof, to increase the rate of heat generated, or to raise the temperature of the aircraft surface 20 a threshold heat level, such that the system and method of predicting conditions favorable for the formation of ice can continue to operate.

In yet another non-limiting aspect of the disclosure, when conditions favorable to the formation of ice are present, the controller module 24 can provide indication, for example, via the display 30, or operate a system 40 to change the current aircraft flight plan, heading, direction, or the like, to avoid icing conditions. For instance, the indication can include a suggestion for the pilot or co-pilot to alter or modify the flight plan, or can instruct another system 40 or subsystem of the aircraft to actually modify the flight plan of the aircraft. For instance, the controller module 24 can instruct an autoflight or auto-pilot system to examine, compute, determine, execute, or the like, an alternative flight plan based on the determination that conditions favorable to the formation of ice are present. In yet another non-limiting aspect of the disclosure, the comparison and satisfaction of another or a different threshold cycle period can indicate that ice has actually formed (as opposed to predicting the conditions favorable for the formation of ice). In this example, further application of de-icing systems, ice shedding operations, or the like can be included or responsive such that the system or methods of operating can return to predicting the conditions favorable to the formation of ice.

In this sense, the anti-icing system can operably predict the formation of ice on a structure by way of sensing and comparing a sensed or measured thermal cycling period, or for example, a rate of change thereof, with a threshold thermal cycling period (or rate of change), and determine or predict whether the formation of ice is possible or likely to occur, based on the determination or prediction. Non-limiting aspects can be included wherein the anti-icing system further employs or operates anti-icing or de-icing strategies in response to the determination or prediction of the formation of ice. Non-limiting examples of anti-icing or de-icing strategies in response to the determination or prediction can include, but are not limited to, operating the heating element 44 or heat generating circuit 42, operating the heating element 44 or heat generating circuit 42 for a longer period of time, reaching a higher heating or temperature set point, or the like.

Aspects of the anti-icing system can thus pre-empt the formation of ice based on the determination that conditions favorable to the formation of ice are present, and can adjust the operation of the aircraft based on that determination.

Figure 3:
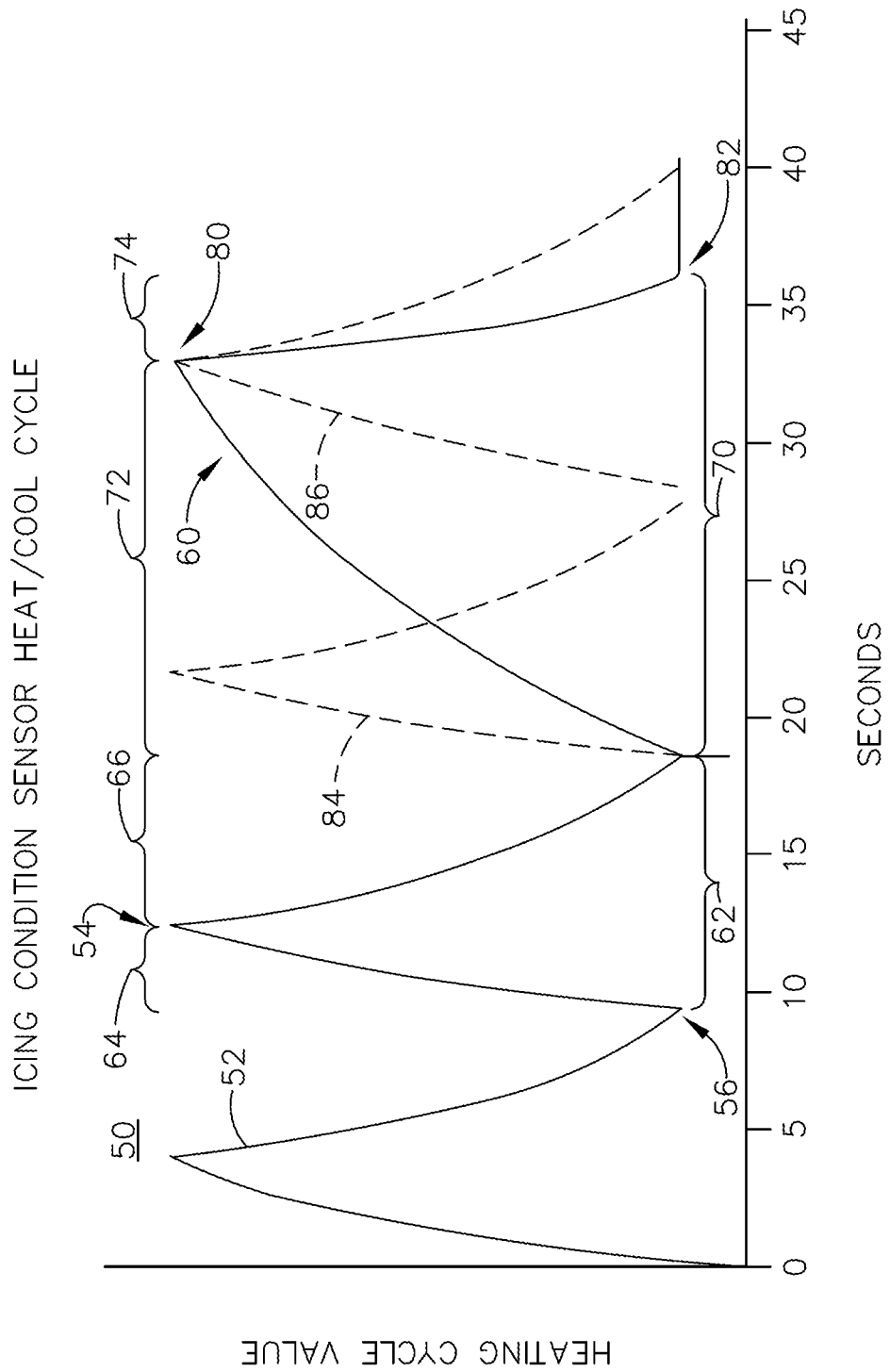
FIG. 3 is a plot graph showing operation of the system of FIG. 2, in accordance with various aspects described herein.

FIG. 3 illustrates a plot graph 50 showing operation of the anti-icing system in accordance with aspects of the disclosure. As shown, a sensed value 52 is logged over a period of time, showing a set of thermal cycles or sensed thermal cycling periods 62 indicative that the conditions favorable for the formation of ice are not present. The sensed thermal cycling period 62 can include an increasing or heating cycle period 64 indicated by a rising heating sensed value 52 (e.g. such as a rise in temperature during the heating period of the cycle 62) from a local minima cycle value 56 to a local maxima cycle value 54. The sensed thermal cycling period 62 can further include a decreasing or cooling cycle period 66 indicated by a falling heating sensed value 52 (e.g. such as when the heat generating circuit is disabled and the aircraft surface is cooled by the environment). The sensed thermal cycling period 62 can be repeated over a period of time.

The plot graph 50 also illustrates when the sensed value 52 is logged over a period of time when the aircraft is exposed to conditions favorable for the formation of ice 60. As shown, a sensed thermal cycling period 70 while conditions favorable for the formation of ice are present provides a different thermal cycle or thermal cycling period 70, compared to the thermal cycling period when the conditions are not present. The thermal cycling period 70 can include an increasing or heating cycle period 72 indicated by a rising heating sensed value 52 (e.g. such as a rise in temperature during the heating period of the cycle 72). The increasing or heating cycle period 72 takes a longer or greater period of time to reach the local maxima 54 from the local minima 56, compared with the heating cycle period 64. This can be due to, for example, the conditions favorable to icing, such as the increased liquid water content in the environment, which is exposed to the aircraft surface 20. In this example, the environment exposed to the aircraft surface 20 can affect the temperature of the aircraft surface 20, which in turn requires additional time, additional heat, or an additional thermal cycling period (e.g. longer heating cycle period 72) to account for or respond to the change in conditions. In one non-limiting example, a higher liquid water content of the environment can result in a higher or an increased specific heat capacity of the environment. In an atmospheric environment, such as during flight, the higher liquid content in the atmosphere can act as, or similar to, an impinging fluid on an aircraft surface 20, rapidly reducing the temperature of the aircraft surface 20.

The plot graph 50 illustrates an example overlay of a first "normal" thermal cycling period 84 and a second "normal" thermal cycling period 86 that does not indicate conditions favorable to icing, in dotted line. The first thermal cycling period 84 can be similar to the earlier described thermal cycling period 62, or can represent a threshold thermal cycling period. As shown, the second thermal cycling period 86 is aligned with the local maxima 80 of the sensed value 60 when exposed to conditions favorable for the formation of ice, for comparison relative to the first and second "normal" thermal cycling periods 84, 86. As shown, the heating period of the cycle 72 where icing conditions might be present is a longer period of time compared with the heating period of the first thermal cycling period 84. In one non-limiting example, a comparison of the heating period of the cycle 72 and the heating period of the first thermal cycling period 84 can indicate the presences of conditions favorable for icing.

The thermal cycling period 70 of the plot graph 50 can also include a decreasing or cooling cycle period 74 indicated by a falling heating sensed value 52 (e.g. such as when the heat generating circuit is disabled and the aircraft surface is cooled by the environment, for example, falling to a local minima 82). The decreasing or cooling cycle period 74 takes a shorter or less period of time to reach the local minima 56 from the local maxima 54, compared with the cooling cycle period 66. This can be due to, for example, the conditions favorable to icing, such as the increased liquid water content in the environment, which is exposed to the aircraft surface 20, rapidly cooling the surface 20. The thermal cycling period 70 can be repeated over a period of time.

The plot graph 50 illustrates an example overlay of a second "normal" thermal cycling period 86 that does not indicate conditions favorable to icing, in dotted line. The second thermal cycling period 86 can be similar to the earlier described thermal cycling period 62, the first "normal" cycling period 84, or can represent a threshold thermal cycling period. As shown, the cooling period of the cycle 74 where icing conditions might be present is a shorter period of time compared with the cooling period of the second thermal cycling period 86. In one non-limiting example, a comparison of the cooling period of the cycle 74 and the cooling period of the second thermal cycling period 86 can indicate the presences of conditions favorable for icing. In another non-limiting example, a combination of the comparisons between the heating and cooling cycle periods 72, 74 and the threshold thermal cycling periods can be utilized to determine whether conditions favorable for icing are present. In yet another non-limiting example, a ratio between the heating and cooling cycle periods 72, 74 can be compared with a threshold thermal cycling period ratio (e.g. between "normal" heating and cooling cycle periods) to determine whether conditions favorable for icing are present.

Figure 4:
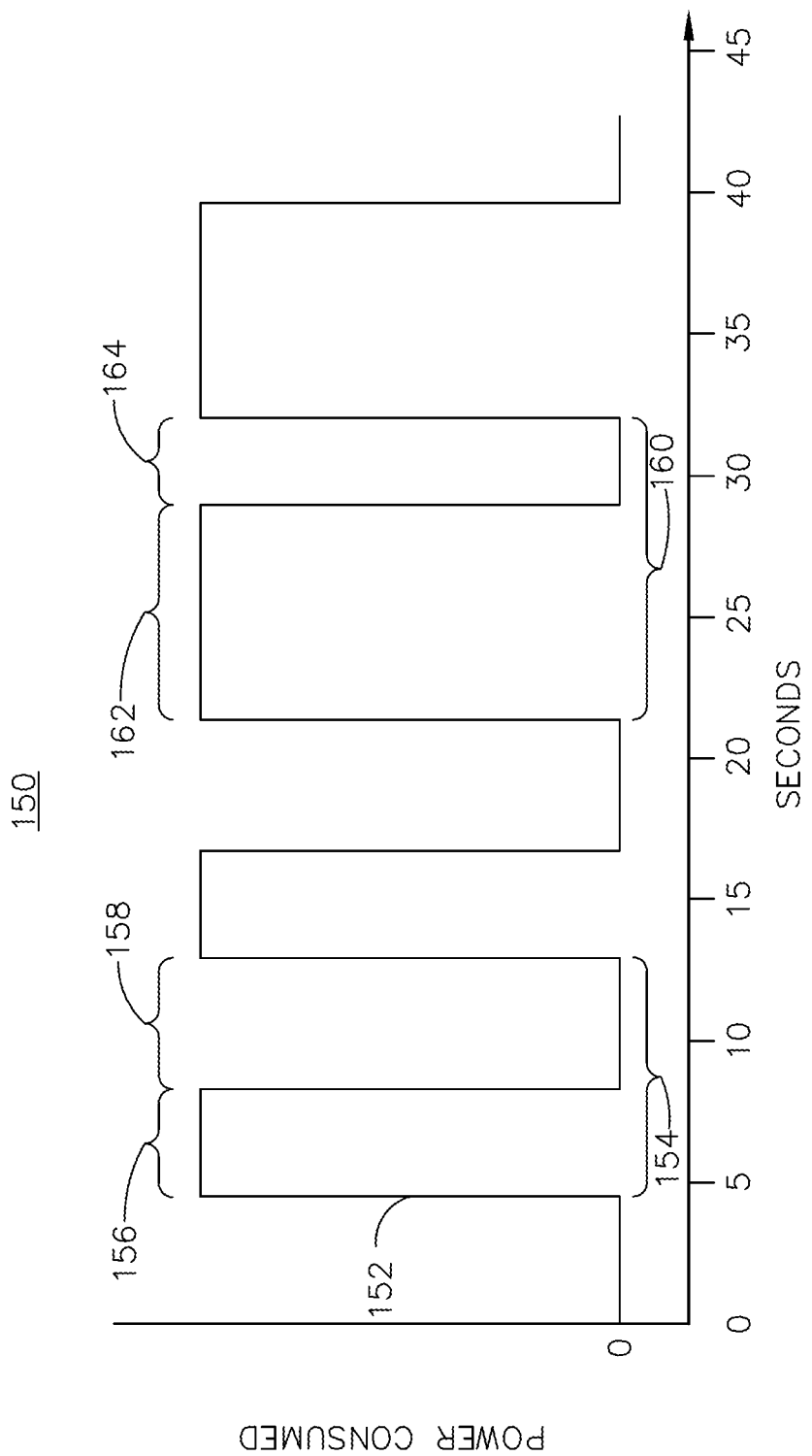
FIG. 4 is another plot graph showing operation of the system of FIG. 2, in accordance with various aspects described herein

FIG. 4 illustrates a plot graph 150 showing operation of the anti-icing system in accordance with aspects of the disclosure. As shown, a sensed value 152 can include a sensed power value, which is logged over a period of time, showing a set of power cycles or sensed power cycling periods 154 indicative that the conditions favorable for the formation of ice are not present. The sensed power cycling period 154 can include an energizing cycle period 156 (e.g. power consumed by a heating element increases, such as during the aforementioned heating cycle period 64) and a non-energizing cycle period 158 (e.g. heating element is not energized, such as during the aforementioned cooling cycle period 66).

The plot graph 150 further illustrates a sensed power value 152 power cycling period 160 indicative that the conditions favorable for the formation of ice are present. Compared with the non-indicative power cycling period 154, the indicative power cycling period 160 consumes more power over an energizing cycling period 162, has a shorter non-energizing cycle period 164, or a combination thereof. In non-limiting examples, the sensed power value 152 can represent a threshold thermal cycling period. In this sense, a threshold thermal cycling period can be represented as a threshold power cycling period value, range, or the like.

It will be understood that aspects of the disclosure can be included wherein the comparison between the sensed thermal cycling period and the threshold thermal cycling period are relative or static. For example, in one nonlimiting aspect, a heating cycle period 72 longer than 10% of a typical, recent, or predetermined threshold heating cycle period can be determined to indicate conditions favorable for the formation of ice. In another non-limiting aspect, a heating cycle period 72 longer than ten seconds (for instance, to heat the aircraft surface 20 to reach a temperature set point) can be determined to indicate conditions favorable for the formation of ice. In another non-limiting aspect, a cooling cycle period 74 shorter than 10% of a typical, recent, or predetermined threshold cooling cycle period can be determined to indicate conditions favorable for the formation of ice. In yet another non-limiting aspect, a cooling cycle period 74 shorter than six seconds can be determined to indicate conditions favorable for the formation of ice. Similarly, in one non-limiting aspect, an energizing cycle period 162 longer than 10% of a typical, recent, or predetermined threshold heating cycle period, or greater than 500 watts of consumed power, can be determined to indicate conditions favorable for the formation of ice. In another non-limiting aspect, a non-energizing cycle period 164 shorter than 10% of a typical, recent, or predetermined threshold heating cycle period can be determined to indicate conditions favorable for the formation of ice. Any permutation of comparisons between sensed values 52, sensed power values 152, the like, or a combination thereof, can be utilized for comparisons and determination whether conditions favorable for the formation of ice is present.

Figure 5:
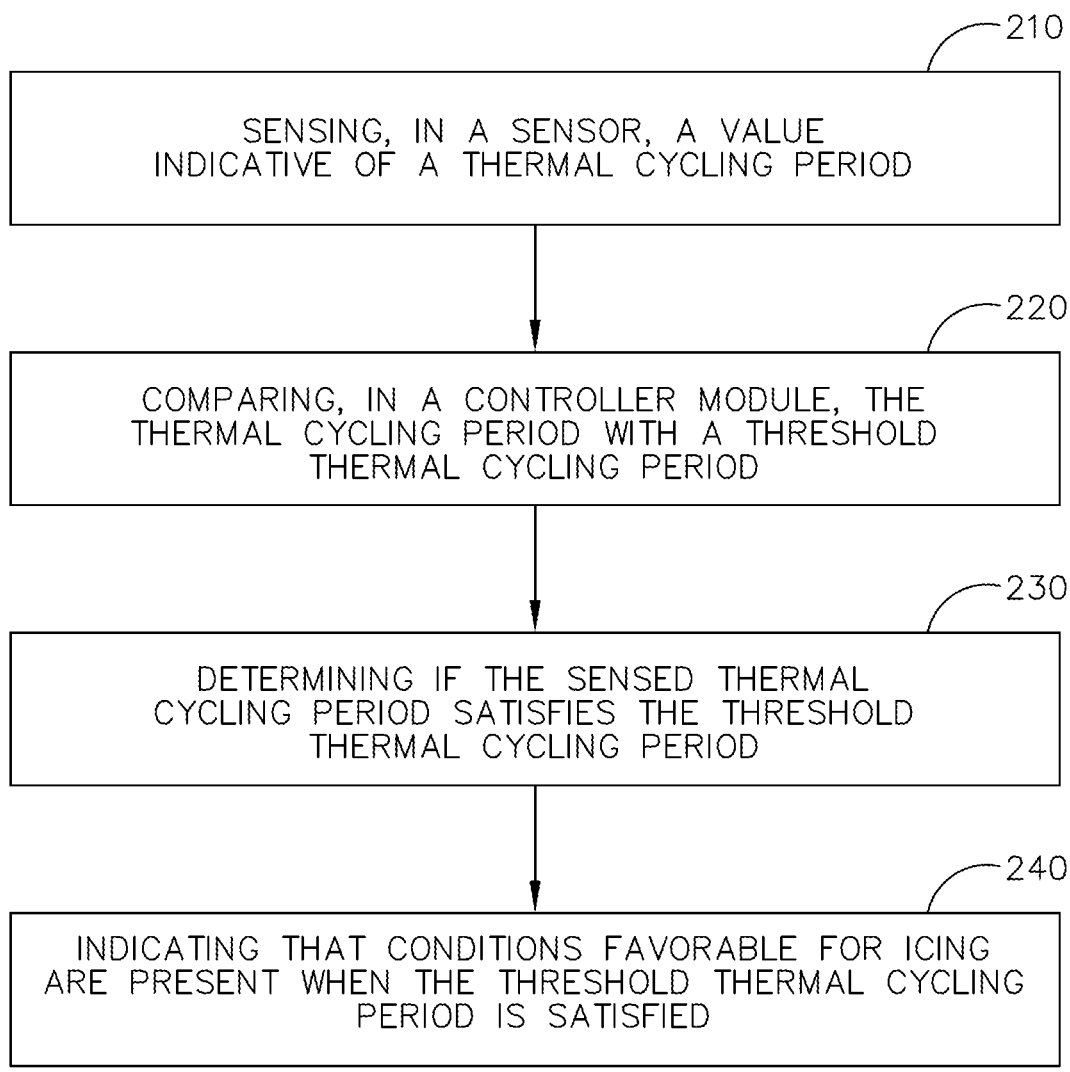
FIG. 5 is an example a flow chart diagram of demonstrating a method of predicting conditions favorable for icing in accordance with various aspects described herein.

FIG. 5 illustrates a flow chart demonstrating a method 200 of predicting conditions favorable for icing. The method 200 begins by sensing, in a sensor adapted to sensing a value indicative of a thermal cycling period, at 210. Next, the method 200 can compare, in a controller module, the sensed thermal cycling period with a threshold thermal cycling period, at 220. The method 200 can then determine, in the controller module, if the sensed thermal cycling period satisfies the threshold thermal cycling period, at 230. Finally, if the comparison satisfies the threshold thermal cycling period, the method 200 can indicate, by the controller module, that conditions favorable for icing are present, at 240.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method, as described herein. For example, non-limiting aspects of the disclosure can be included wherein, for example, the method 200 further includes altering an operation of a system based on the indication, as described herein.

Many other possible aspects and configurations in addition to that shown in the above figures are contemplated by the present disclosure. For example, aspects of the disclosure can be included wherein similar sensor data, heating or cooling cycles, or energizing cycles can be compared with a threshold value to predict whether an environmental condition is present, or likely to be present. In this example, the possible environmental condition is not limited to icing conditions.

The aspects disclosed herein provide a system and method for predicting whether conditions favorable for the formation of ice are present, based on sensor data over a period of time. The technical effect is that the above described aspects enable the predicting and indicating of conditions favorable for the formation of ice, even before ice actually forms. One advantage of the disclosure described can include that increased accuracy in predicting conditions favorable for the formation of ice can lead to preemptive action to avoid icing. Another advantage can include limiting or reducing power requirements for anti-icing or de-icing systems to only periods of time when conditions favorable for the formation of ice are present, compared with routine cycling of such systems.

Yet another advantage to aspects of the disclosure can include aircraft-surface-specific prediction strategies or thresholds, wherein a first aircraft surface (e.g. a nacelle) can have different thresholds to predict conditions favorable for the formation of ice, compared with another aircraft surface (e.g. a wing). Yet another advantage to aspects of the disclosure can include increased or improved status communication or awareness of the conditions favorable for the formation of ice, leading to increased situational awareness and improved decision making due to ice-based considerations. Such increased situational awareness can be improved even in aircraft without anti-icing or de-icing systems, as the communication or awareness of conditions favorable for the formation of ice can result in a more strategic flight plan or decision-making.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of predicting conditions favorable for icing, the method comprising:
   sensing, in a sensor, a value indicative of a thermal cycling period in a component having alternating heating cycles defined by a first time period and cooling cycles defined by a second time period;
   comparing, in a controller module, the sensed value indicative of a thermal cycling period with a threshold value of a thermal cycling period that is indicative of conditions favorable for a formation of ice for the component, wherein the threshold value of a thermal cycling period is based on a ratio of the first time period to the second time period, wherein comparing includes comparing a ratio of a sensed increasing thermal cycling period to a sensed decreasing thermal cycling period with a threshold thermal cycling period ratio;
   determining, in the controller module, if the sensed value indicative of a thermal cycling period satisfies the threshold value of a thermal cycling period; and if so,
   indicating, by the controller module, that conditions favorable for icing are present; and
   altering operation of a system based on the indication.

2. The method of claim 1 wherein determining includes determining if the sensed value is indicative of an increasing thermal cycling period that is greater than a threshold increasing thermal cycling period.

3. The method of claim 2 wherein comparing further includes comparing a sensed value indicative of a decreasing thermal cue cycling period with a threshold decreasing thermal cycling period.

4. The method of claim 3 wherein determining includes determining whether the sensed value indicative of an increasing thermal cycling period is indicative of an increasing thermal cycle period that is greater than the threshold increasing thermal cycling period, and whether the sensed value indicative of a decreasing thermal cycling period is indicative of a decreasing thermal cycling period that is less than the threshold decreasing thermal cycling period.

5. The method of claim 3 wherein determining further includes determining whether the sensed value indicative of a decreasing thermal cycling period is indicative of a decreasing thermal cycling period that is less than the threshold decreasing thermal cycling period.

6. The method of claim 1 wherein indicating includes providing indication on a display.

7. The method of claim 1 wherein indicating includes providing the altered operation of the system in the form of a flight plan modification.

8. The method of claim 1 wherein altering includes modifying a flight plan.

9. The method of claim 1 wherein indicating further includes providing indication to an anti-icing system.

10. The method of claim 9, wherein the altering includes automatically operating a de-icing system in response to the indicating.

11. The method of claim 10 wherein the operating prevents ice from accumulating on an aircraft surface.

12. The method of claim 11 wherein the operating further comprises modifying a predetermined cycle of operation of the de-icing system.

13. The method of claim 1 wherein the sensing further includes sensing, in a temperature sensor, a temperature cycling period.

14. The method of claim 1 wherein the sensing further includes sensing, in a power sensor, a power value indicative of power consumed by a heat generating circuit during a thermal cycling period.

15. A system for predicting environmental conditions, the system comprising:
   a heat generating circuit that operates in alternating thermal cycles defined by a first period of time when the heat generating circuit generates heat while energized, and by a second period of time when the heat generating circuit does not generate heat while not energized;
   a sensor adapted to sense a value indicative of a thermal cycling period of the heat generating circuit; and
   a controller module configured to compare the sensed value indicative of the thermal cycling period with a threshold value of a thermal cycling period, wherein the comparison includes comparing a ratio of a sensed increasing thermal cycling period to a sensed decreasing thermal cycling period with a threshold thermal cycling period ratio;
   determine if the sensed value indicative of thermal cycling period satisfies the threshold value of a thermal cycling period, and indicate that conditions favorable for icing exist when the sensed value indicative of a thermal cycling period satisfies the threshold value of a thermal cycling period, wherein the threshold value of a thermal cycling period is based on a ratio of the first period of time to the second period of time.

16. The system of claim 15 wherein the heat generating circuit is a de-icing circuit for an aircraft.

17. The system of claim 15 wherein the sensor is at least one of a power sensor or a temperature sensor.

* * * * *